United States Patent
Squires, Sr.

(10) Patent No.: US 7,530,581 B1
(45) Date of Patent: May 12, 2009

(54) KIT FOR USE IN PROVIDING A MOBILE BASE

(76) Inventor: Charles T. Squires, Sr., 9 Ridgeside Rd., Chattanooga, TN (US) 37411

( * ) Notice: Subject to any disclaimer, the term of this patent is extended or adjusted under 35 U.S.C. 154(b) by 372 days.

(21) Appl. No.: 11/599,806

(22) Filed: Nov. 15, 2006

Related U.S. Application Data

(60) Provisional application No. 60/808,466, filed on May 26, 2006, provisional application No. 60/808,435, filed on May 26, 2006, provisional application No. 60/799,576, filed on May 12, 2006, provisional application No. 60/799,983, filed on May 15, 2006, provisional application No. 60/808,179, filed on May 25, 2006, provisional application No. 60/799,710, filed on May 12, 2006, provisional application No. 60/774,224, filed on Feb. 28, 2006.

(51) Int. Cl.
*B62B 1/12* (2006.01)
(52) U.S. Cl. .................. 280/79.11; 280/651; 280/47.35
(58) Field of Classification Search .............. 280/79.11, 280/79.3, 79.4, 79.6, 79.7, 47.34, 47.41, 280/33.991, 651, 47.35
See application file for complete search history.

(56) References Cited

U.S. PATENT DOCUMENTS

| | | | | |
|---|---|---|---|---|
| 2,961,250 A | * | 11/1960 | Beach | 280/35 |
| 5,005,848 A | * | 4/1991 | Cornell | 280/79.11 |
| 5,599,031 A | * | 2/1997 | Hodges | 280/79.11 |
| 6,095,533 A | * | 8/2000 | Balolia | 280/35 |
| 6,109,625 A | * | 8/2000 | Hewitt | 280/43.24 |
| 6,402,167 B1 | * | 6/2002 | Calleja | 280/79.3 |
| 6,955,368 B2 | * | 10/2005 | Bakhoum | 280/79.3 |
| 7,090,187 B2 | * | 8/2006 | Tusavitz | 248/346.07 |
| 7,213,820 B2 | * | 5/2007 | Drummond | 280/79.11 |
| 7,383,612 B2 | * | 6/2008 | Bushey | 16/29 |
| 2003/0201619 A1 | * | 10/2003 | Teng et al. | 280/79.11 |

OTHER PUBLICATIONS

Amazon.com printout of Jet 708119 Mobile Base.

* cited by examiner

*Primary Examiner*—Christopher P Ellis
*Assistant Examiner*—John D Walters
(74) *Attorney, Agent, or Firm*—Stephen J. Stark; Miller & Martin PLLC

(57) ABSTRACT

A kit for use in providing a mobile base for equipment is shown. Four corner brackets connect width and length members together into a frame and four stepdown brackets receive legs of the equipment. Strengthening brackets add to the strength of the stepdown brackets and covers assist in connecting rollers to the corner brackets.

20 Claims, 4 Drawing Sheets

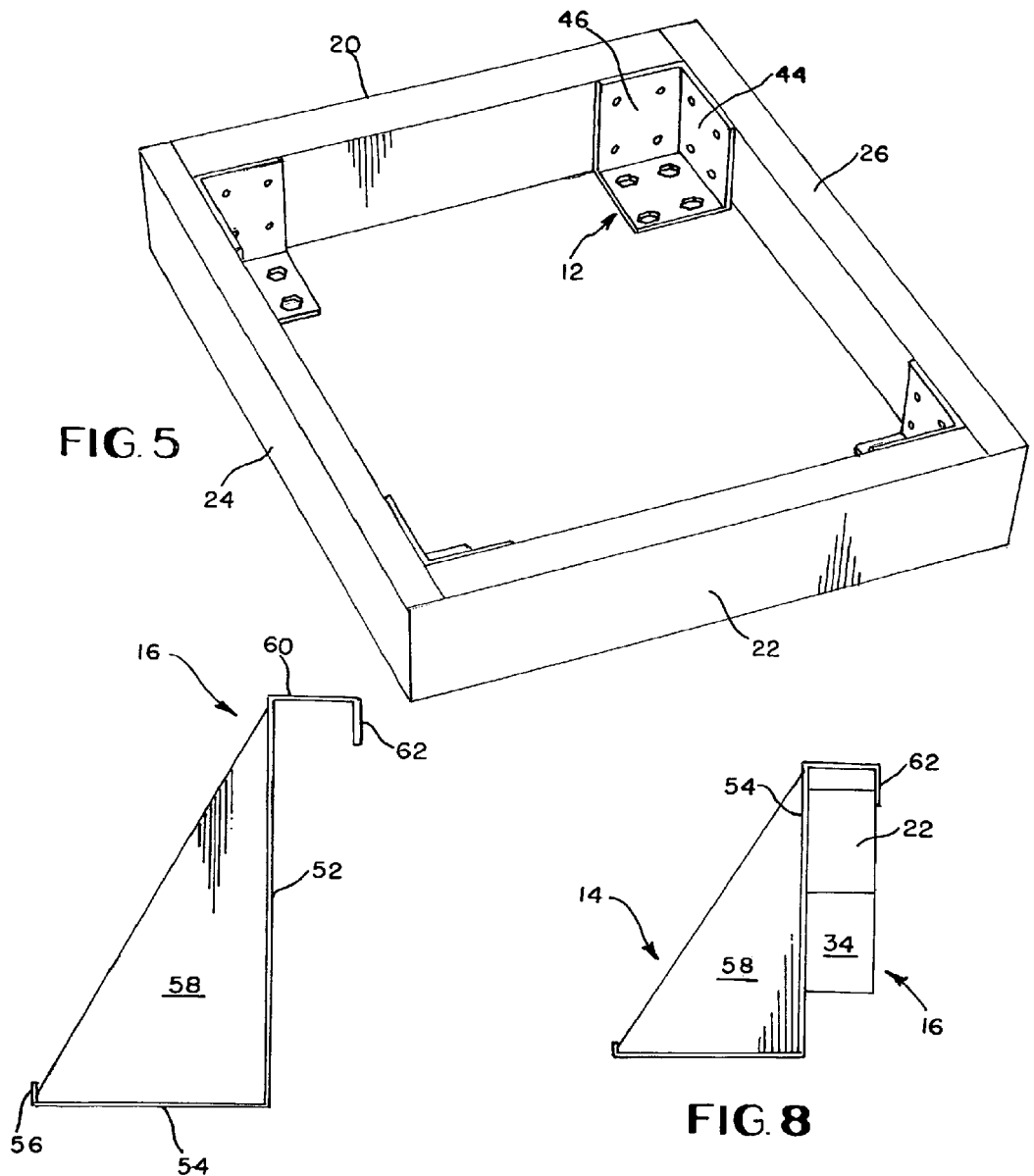

KIT FOR USE IN PROVIDING A MOBILE BASE

CLAIM OF PRIORITY

This application claims the benefit of U.S. Provisional Patent Application Nos. 60/808,466, 60/808,435, 60/799,576, 60/799,983, 60/808,179, and 60/799,710 filed May 26, 2006, May 26, 2006, May 12, 2006, May 15, 2006, May 25, 2006, and May 12, 2006, respectively.

FIELD OF THE INVENTION

The present invention relates to a kit having a bracket and roller system for providing a base on which equipment such as woodworking equipment may be placed thereon so that the equipment may be rolled to a desired location by a user and then rolled to another location such as for storage.

DESCRIPTION OF RELATED ART

In attempting to provide a woodworking shop in a relatively small space, the applicant discovered that after a number of pieces of equipment were acquired that the amount of room in the workshop was diminishing. It then became necessary to move individual pieces of equipment. Although mobile bases for specific pieces of equipment are believed by the applicant for specific pieces of equipment, the applicant was unable to find any mobile base which would work with the equipment that had already been purchased. Additionally, since the applicant was not skilled in the art of welding, attaching metal casters to metal legs of equipment was not a possibility. Accordingly, the applicant set out to develop a system for providing a kit to provide a base for being able to move otherwise awkward equipment.

SUMMARY OF THE INVENTION

It is an object of the present invention to provide a kit for use in manufacturing a mobile base for use with shop equipment.

It is another object of the present invention to provide an improved bracket structure for use with bases for shop equipment and other heavy articles.

It is another object of the present invention to provide an improved base structure having significant strength and other advantages of mobility for equipment that would otherwise not be provided on rollers.

Accordingly, in accordance with the presently preferred embodiment of the invention, a kit is provided having four corner brackets, four bolt covers, four step down brackets and four strengthening brackets. These sixteen parts are preferably provided in a kit to a customer who then obtains four rollers such as swivel locking casters, a plurality of nuts, bolts, lock washers and screws along with a frame material such as one or more two by fours, two by twos, one by fours, plywood, or other desirable material. The lumber can be sized to the specifications of the customer and then the kit assembled preferably following instructions provided by the applicant and the result is a mobile base onto which a piece of equipment such as a router table, table saw, or other pieces of equipment can then be placed and then moved as desired by the user. This is believed to provide increased flexibility for many shop environments in that when a piece of equipment is not in use, it can be stored out of the way.

BRIEF DESCRIPTION OF THE DRAWINGS

The particular features and advantages of the invention as well as other objects will become apparent from the following description taken in connection with the accompanying drawings in which:

FIG. 5 shows an alternate embodiment of assemblies of corner bracket as shown in FIG. 4;

FIG. 6 shows a side plan view of a step down bracket of the presently preferred embodiment with an optional lip retainer as shown in FIG. 1;

FIG. 8 shows the side view of the step down bracket and strengthening bracket as shown in FIG. 1 mounted along the width or length members.

DETAILED DESCRIPTION OF THE PREFERRED EMBODIMENT

Figure 1:
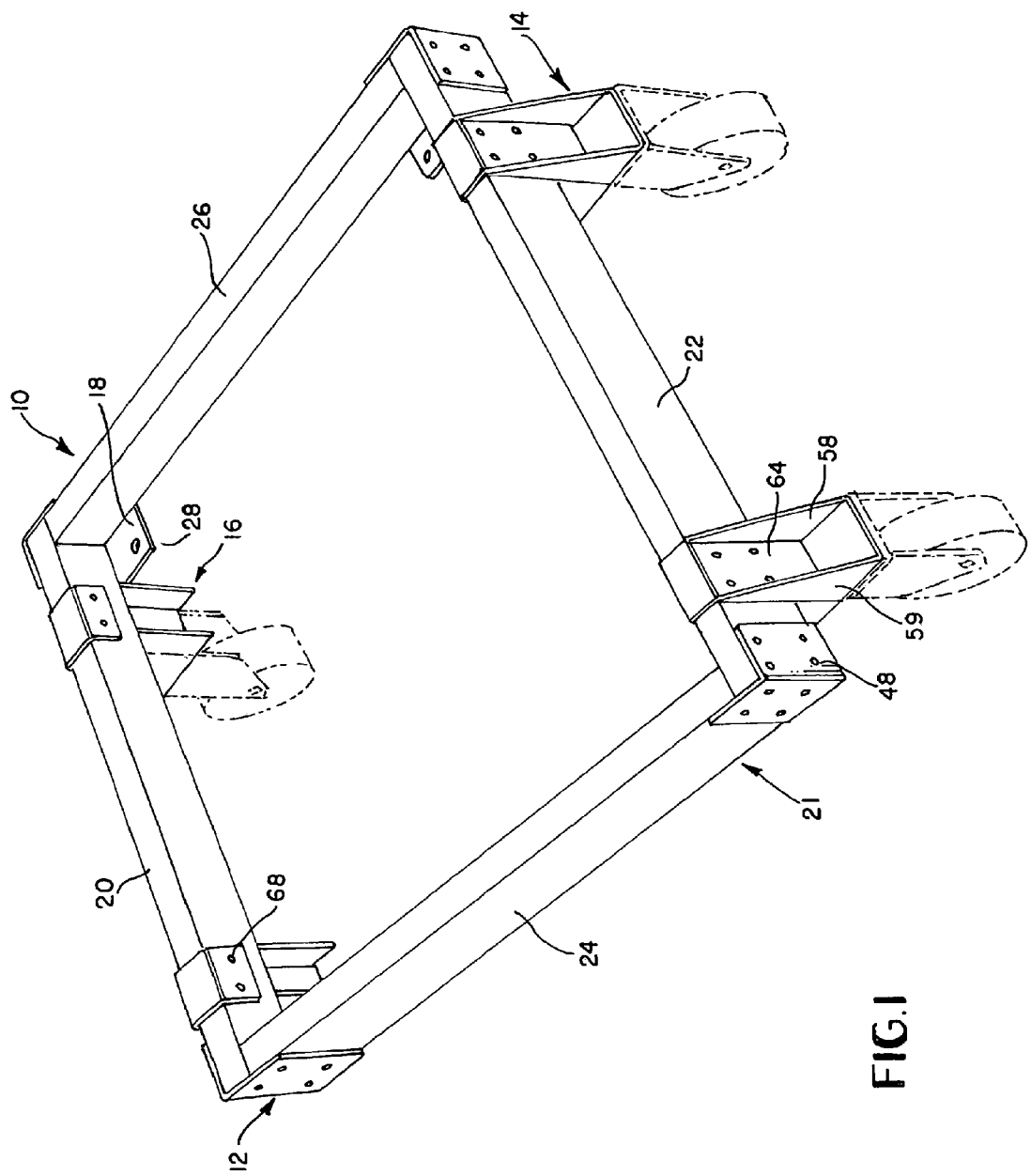
FIG. 1 shows a kit of the presently preferred embodiment in relation to length and width members which are shown in dotted lines.

FIG. 1 shows a presently preferred embodiment of the present invention. Specifically, a kit 10 for use with making a mobile base for use with items with legs that have not been provided with mobility is contemplated. The kit 10 preferably has four corner brackets 12, four stepdown brackets 14, four strengthening brackets 16 and four covers 18. Each of these components will be discussed in further detail below. Additionally, it is anticipated that a user will also acquire two width members 20,22 and two length members 24,26, as well as connectors and rollers (not shown).

The kit 10 is preferably assembled by cutting, or otherwise obtaining width members 20,22 and length members 24,26, such as from 2×4's, 2×2's 1×4's or other appropriate source such as plywood or even non-wood members, as would be understood by one of ordinary skill in the art.

The first and second width members 20,22 are usually the same length and the first and second length members 24,26 are usually the same length so that when assembled as shown in FIG. 1, a rectangle is formed when using the corner brackets. Of course they could be different lengths, such as off by the width of a member, or otherwise, depending on the particular embodiment. Nevertheless, once assembled a rectangle is formed when the corner brackets 12 are connected to corresponding length and width members. More detail regarding the construction of the corner brackets will be provided below.

Along the width members 20,22 are located stepdown brackets 14 which are located internally to the corner brackets 12. They can be outwardly oriented as illustrated, or they could be interiorly oriented in other embodiments. Details of the construction of the stepdown brackets 14 will be provided below.

On top of a base 28 of a corner bracket 12 are located covers 18 which can assist in providing a smooth surface or at least a suitable surface for supporting the length and width members 24,26 and 20,22 and possibly assisting in locking connector heads from connectors extending through the base 28 which connect to a roller (not shown). FIG. 1 shows a partially assembled version (with no connectors illustrated), but as one skilled in the art would understand various connectors, whether self drilling/self tapping screws, Phillips head exterior screws, bolts, nuts, or other various connectors could be utilized to securely affix the corner brackets 12 to the length and width members 24,26 and 20,22 as well as the stepdown brackets 14 to the width members 20,22 and the strengthening brackets 16 to the width members 20, 22. If nuts and bolts are utilized, of course, lockwashers are useful.

With the length and width members 24,26, and 20,22 assembled with corner brackets 12, a frame 21 is created. From the frame 12, stepdown brackets 14 extend downwardly therefrom to provide a location above a floor for legs of a four legged structure to be supported thereon. Various equipment such as shop equipment like lathes, table saws, router tables, radial arm saws, band saws, furniture such as cabinets or other four legged structures could be supported thereon. The stepdown feature is believed to be advantageous since equipment is not significantly raised (such as less than an inch, and maybe around ¼ to ½ an inch above the ground which is relatively insignificant.

Figure 2A:
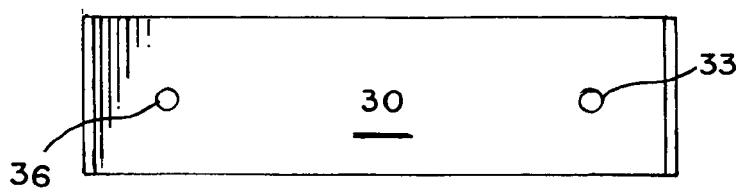
FIG. 2A shows a bottom plan view of a strengthening bracket as shown in FIG. 1.
Figure 2B:
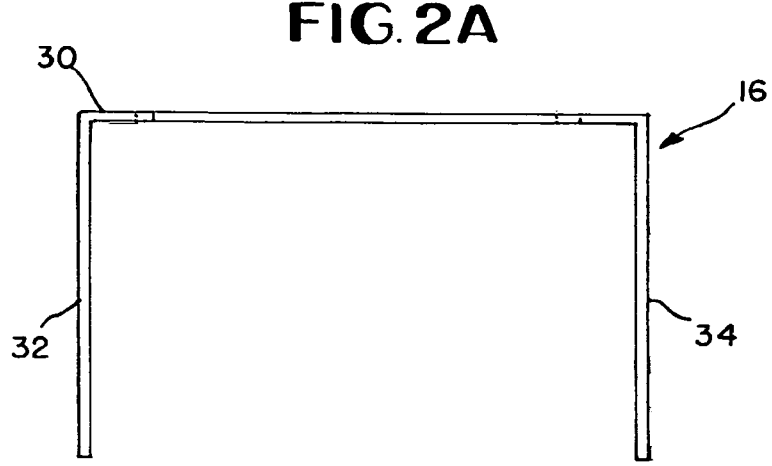
FIG. 2B shows a side view of a strengthening bracket shown in FIGS. 1 and 2A.
Figure 3:
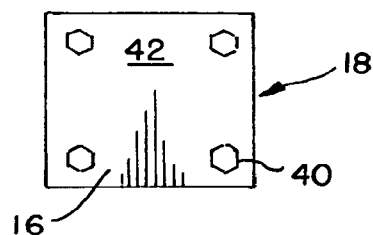
FIG. 3 shows a bolt cover as shown in FIG. 1.

Strengthening brackets 16 are shown in FIG. 2a prior to installation as shown in FIG. 1. Specifically a platform 30 is preferably provided having at least one, and preferably two downwardly extending legs 32,34. The legs 32, 34 are illustrated as extending parallel to one another and perpendicularly relative to the platform 30. The strengthening brackets 14 in the preferred embodiment were made of 14 gage steel, but other materials could be utilized. They are utilized to add strength to the stepdown brackets 14 as will be discussed below. In the preferred embodiment, when using the strengthening brackets 16, the stepdown brackets 14 were able to support over 150 pounds apiece to provide a total support of 600 pounds which should be enough for heavy shop equipment like that the applicant has had to move and now enjoys the ability to move with assembled kits 10. Although four strengthening brackets 16 are illustrated, more could be employed. Further more, they could be machined or otherwise formed as would be known by one of ordinary skill in the art. Bores 36, 38 are preferably drilled through the platform 30 to provide a location to drill screws or otherwise connect the platform to a width member 20 or 22.

Figure 4:
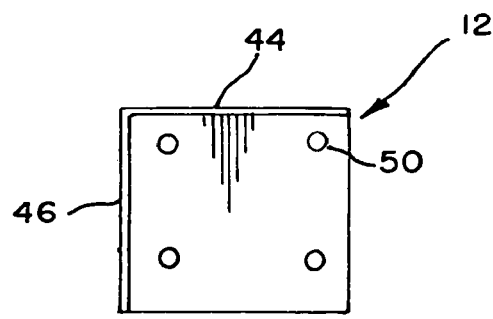
FIG. 4 shows a top view of a corner bracket as shown in FIG. 1.

Cover 18 is rather useful in the preferred embodiment. They are preferably provided with cutouts 40 which receive nuts which are to be tightened (when the pass through bases 28 of the corner brackets 12 as can be understood from reference to FIG. 1) to connect rollers (not shown) to the corner brackets 12. Rollers are preferably locking and/or swivel caster construction such as those having three inch soft rubber (3R). Tread may be 1¼ inch or otherwise and a dynamic load rating in the preferred embodiment is 150 pounds per caster. A swivel radius is 2$^{15}$/$_{16}$ inches and a mounting height was 3$^{3}$/$_{16}$ inches. Other dimensions could be utilized in other embodiments. In addition to locking nuts or bolts, the covers 18 also provide a resting surface on which width and length members 20,22,24,26 may rest upon. FIG. 4 shows a corner bracket 12. Base member 28 is preferably planar and has first and second walls 44,46 upwardly expending, preferably perpendicularly thereto. First and second walls 44,46 are also preferably planar and extend perpendicular to one another. The first and second walls 44,46 preferably have bores 48 as illustrated in FIG. 1 which receive a screw or other connector to connect the corner brackets 12 to the members 20,22,24,26.

Bores 50 in the base member 28 preferably align with the cutouts 40 in the cover 18 so that nuts or bolt heads can be easily retained by the cover when installing rollers on the bottom of the base member 28. Corner brackets 12 are preferably formed 18 gage cold rolled steel or other appropriate material while the cover 18 may be metal or even injection molded plastic. Forming corner brackets 12 may be accomplished with a die or otherwise.

FIG. 5 shows an alternative construction method of a frame 21 as shown in FIG. 1. Specifically length and width members 24,26 and 20,22 are connected on exterior portions of first and second walls 44,46 of corner brackets 12 instead of interior portions as shown in FIG. 1. This may be advantageous for some embodiments.

Stepdown bracket 16 is shown in FIG. 6. Back 52 is shown extending downwardly to a leg receiver 54. Leg receiver 54 preferably receives a leg from a piece of equipment as would be understood by one of ordinary skill in the art. Lip 56 is useful to retain the equipment from being inadvertently moved off of the stepdown bracket 16 and is located opposite of the leg receiver 54 from the back 52. Lip 56 preferably parallels back 52 and is perpendicular to leg receiver 54. Gusset (one of two) 58 is shown extending from the back 52 and is believed to provide additional strength. Another gusset 59 shown in FIG. 1 parallels gusset 58 and the two extend at edges of the leg receiver as shown, preferably.

Optional shoulder 60 and retainer 62 are shown, but are not utilized in all embodiments. In some embodiments, bores 64 through wall 52 are utilized to connect to the width member 20,22. While this can also be done in the preferred embodiment, Shoulder 60 extends away from a top of back 52 perpendicularly and retainer 62 extends downwardly therefrom to parallel back 52 and capture a width member such as 22 intermediate thereto for additional support and strength.

Figure 7:
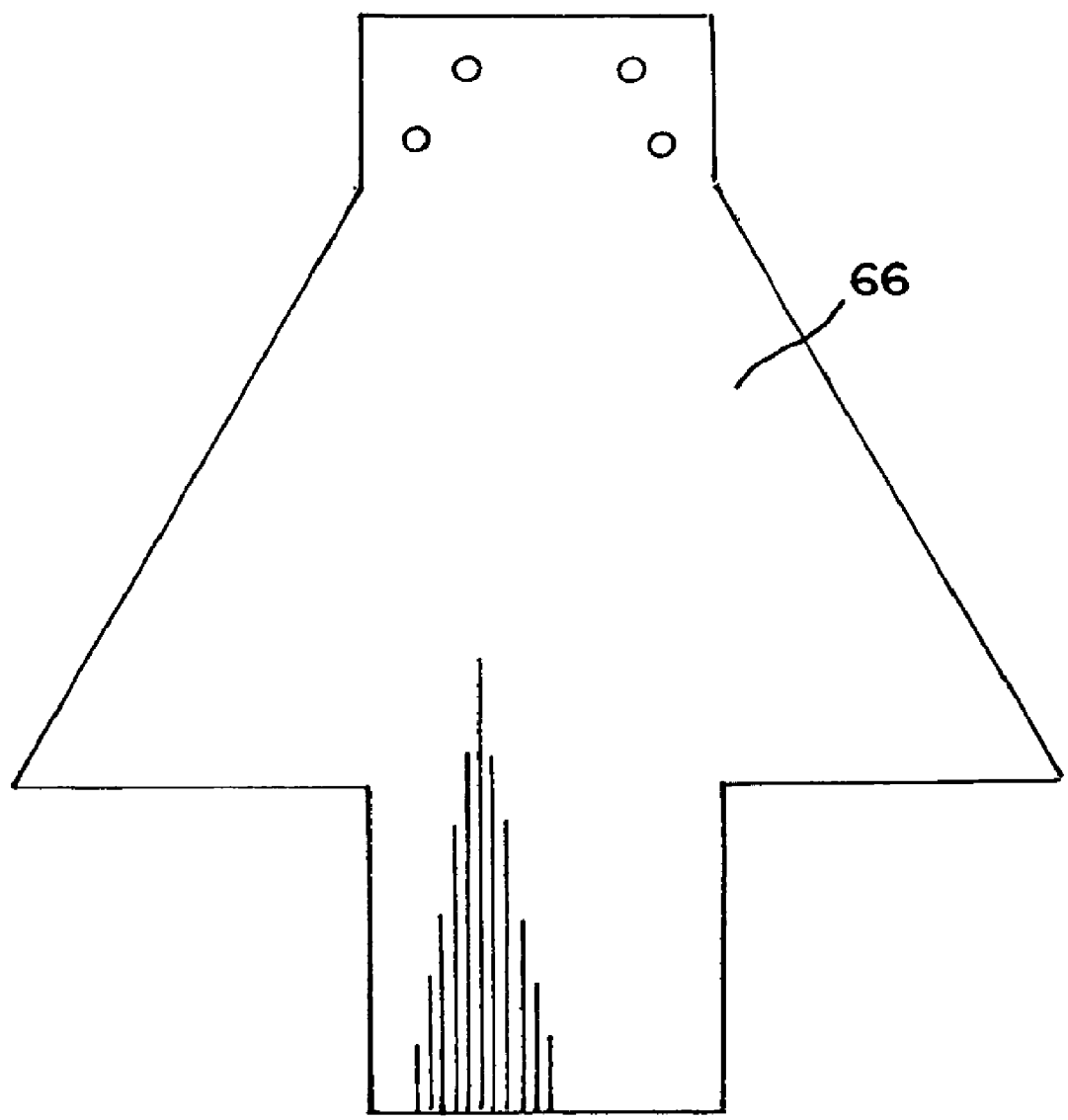
FIG. 7 shows the unitary member prior to being welded up into a step down bracket shown in FIG. 6.

FIG. 7 shows a blank 64 before bending into the desired construction of the stepdown bracket 16. After bending (and drilling bores) all that is left to do is weld up gussets 58,59 to the leg receiver 54 for additional strength. Bores 68 may be useful in the preferred embodiment to retain a stepdown bracket 14 in a desired location.

Finally, FIG. 8 shows the stepdown bracket 14 and strengthening bracket 16 attached to a width member such as 20. Leg 34 contacts a rear portion of back 54 and an upper portion of the width member 20 is illustrated intermediate back 54 and retainer 62. Furthermore width member 20 and leg 34 preferably extend at least half if not at least ⅔ the height of the back to assist in providing strength.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A kit for use in providing a mobile base comprising:
   four corner brackets, each of said corner brackets having a base member connected to first and second walls, said first and second walls extending perpendicularly relative to the base member and having a plurality of bores therethrough, and said first wall oriented perpendicularly relative to the second wall;
   four stepdown brackets, each of said stepdown brackets having a leg receiver connected to a back;

wherein said kit is utilized in conjunction with connectors, two length members, two width members, and four rollers, with the rollers connected to and under the corner brackets and with the length and width members connected with the corner brackets thereby providing a rectangular frame, and with the stepdown brackets connected to the frame at width members with two stepdown brackets located on a first of the two width members and two stepdown brackets located on a second of the two width members with the stepdown brackets located inwardly of the corner brackets on the width members.

2. The kit of claim 1 wherein the stepdown brackets further comprise a lip extending upwardly relative to the leg receiver, said lip disposed opposite relative to the back.

3. The kit of claim 1 wherein the stepdown brackets further comprise a shoulder extending perpendicularly from an upper portion of the back and a retainer extending perpendicularly downward from the shoulder parallel to the back, wherein one of the width members is disposed intermediate the back and the shoulder when installed.

4. The kit of claim 3 wherein at least one of the back and retainer has bores therethrough.

5. The kit of claim 1 wherein the stepdown brackets further comprise first and second gussets extending from the back to the leg receiver with the first gusset parallel to the second gusset.

6. The kit of claim 5 wherein the stepdown bracket is formed of a unitary member and the gussets are formed by bending and welding the unitary member into position.

7. The kit of claim 1 further comprising four strengthening brackets, said strengthening brackets having at least one leg downwardly extending relative to a platform, said platform connected to a width member at a location with a corresponding stepdown bracket with the leg contacting a rear portion of the back opposite from the leg receiver.

8. The kit of claim 7 wherein each of the strengthening brackets have at least two legs.

9. The kit of claim 8 wherein the two legs are spaced at opposing ends of the platform and are symmetrically disposed relative thereto.

10. The kit of claim 9 wherein the legs and the width member extend at least half of a height of the back of the stepdown bracket.

11. The kit of claim 10 wherein the legs and the width member extend at least two thirds of the height of the back of the stepdown bracket.

12. The kit of claim 1 further comprising four covers, said covers installed on top of the base member of the corner brackets and extend upwardly at least over a portion of the connectors utilized to connect a roller to the corresponding corner bracket.

13. The kit of claim 12 wherein the rollers are lockable casters.

14. The kit of claim 1 wherein the first and second walls of the corner brackets are connected to provide exterior corners of the frame.

15. The kit of claim 14 further comprising four covers, said covers covering the bases of the corner brackets and providing a resting surface for the connecting length and width members at the respective corners.

16. The kit of claim 1 wherein the first and second walls of the corner brackets are connected to provide interior corners of the frame.

17. A kit for use in providing a mobile base comprising:
four corner brackets, each of said corner brackets having a planar base member connected to first and second planar walls, said first and second walls extending perpendicularly relative to the base member and having a plurality of bores therethrough, and said first wall oriented perpendicularly relative to the second wall;
four stepdown brackets, each of said stepdown brackets having a leg receiver connected to a planar back, said back extending perpendicularly to the leg receiver; and
four strengthening brackets, said strengthening brackets having at least one leg downwardly extending relative to a platform;
wherein said kit is utilized in conjunction with connectors, two length members, two width members, and four rollers, with the rollers connected to and under the corner brackets and the length and width members connected with the corner brackets with connectors extending through the bores thereby providing a rectangular frame, and with the stepdown brackets connected to the frame at the width members with two stepdown brackets located on a first of the two width members and two stepdown brackets located on a second of the two width members with the stepdown brackets located inwardly of the corner brackets on the width members, and said platform of the strengthening brackets connected to the width member at a location with a corresponding stepdown bracket with the leg contacting a rear portion of the back opposite from the leg receiver.

18. The kit of claim 17 further comprising four covers extending over the base members of the corner brackets.

19. The kit of claim 17 wherein the stepdown brackets further comprise an upwardly extending lip opposite the back and gussets extending from the back to the leg receiver.

20. The kit of claim 19 wherein the stepdown brackets further comprise a shoulder and a retainer with the shoulder extending perpendicularly away from the back at a top portion of the back and the retainer extending downwardly from the shoulder to be parallel with the back.

* * * * *

UNITED STATES PATENT AND TRADEMARK OFFICE
CERTIFICATE OF CORRECTION

PATENT NO.        : 7,530,581 B1
APPLICATION NO.   : 11/599806
DATED             : May 12, 2009
INVENTOR(S)       : Charles T. Squires, Sr.

It is certified that error appears in the above-identified patent and that said Letters Patent is hereby corrected as shown below:

The title page should be deleted and substitute therefor the attached title page Figure 1 should be replaced with Figure 1 as provided below:

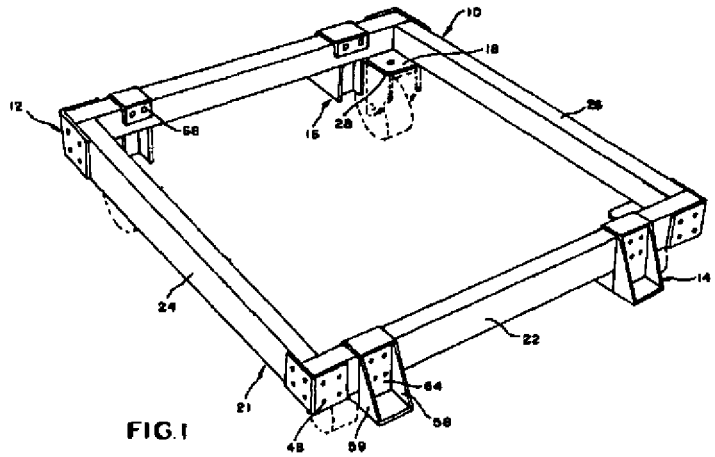

FIG.1

Signed and Sealed this

Twenty-first Day of July, 2009

JOHN DOLL
*Acting Director of the United States Patent and Trademark Office*

(12) United States Patent
Squires, Sr.

(10) Patent No.: US 7,530,581 B1
(45) Date of Patent: May 12, 2009

(54) KIT FOR USE IN PROVIDING A MOBILE BASE

(76) Inventor: Charles T. Squires, Sr., 9 Ridgeside Rd., Chattanooga, TN (US) 37411

( * ) Notice: Subject to any disclaimer, the term of this patent is extended or adjusted under 35 U.S.C. 154(b) by 372 days.

(21) Appl. No.: 11/599,806

(22) Filed: Nov. 15, 2006

Related U.S. Application Data

(60) Provisional application No. 60/808,466, filed on May 26, 2006, provisional application No. 60/808,435, filed on May 26, 2006, provisional application No. 60/799,576, filed on May 12, 2006, provisional application No. 60/799,983, filed on May 15, 2006, provisional application No. 60/808,179, filed on May 25, 2006, provisional application No. 60/799,710, filed on May 12, 2006, provisional application No. 60/774,224, filed on Feb. 28, 2006.

(51) Int. Cl.
*B62B 1/12* (2006.01)

(52) U.S. Cl. .................. 280/79.11; 280/651; 280/47.35

(58) Field of Classification Search .............. 280/79.11, 280/79.3, 79.4, 79.6, 79.7, 47.34, 47.41, 280/33.991, 651, 47.35
See application file for complete search history.

(56) References Cited

U.S. PATENT DOCUMENTS

| | | | | |
|---|---|---|---|---|
| 2,961,250 | A | * | 11/1960 | Beach ................. 280/35 |
| 5,005,848 | A | * | 4/1991 | Cornell ............. 280/79.11 |
| 5,599,031 | A | * | 2/1997 | Hodges ............. 280/79.11 |
| 6,095,533 | A | * | 8/2000 | Balolia ................. 280/35 |
| 6,109,625 | A | * | 8/2000 | Hewitt ............. 280/43.24 |
| 6,402,167 | B1 | * | 6/2002 | Calleja ............. 280/79.3 |
| 6,955,368 | B2 | * | 10/2005 | Bakhoum .......... 280/79.3 |
| 7,090,187 | B2 | * | 8/2006 | Tusavitz .......... 248/346.07 |
| 7,213,820 | B2 | * | 5/2007 | Drummond ....... 280/79.11 |
| 7,383,612 | B2 | * | 6/2008 | Bushey ................. 16/29 |
| 2003/0201619 | A1 | * | 10/2003 | Teng et al. ....... 280/79.11 |

OTHER PUBLICATIONS

Amazon.com printout of Jet 708119 Mobile Base.

* cited by examiner

*Primary Examiner*—Christopher P Ellis
*Assistant Examiner*—John D Walters
(74) *Attorney, Agent, or Firm*—Stephen J. Stark; Miller & Martin PLLC

(57) ABSTRACT

A kit for use in providing a mobile base for equipment is shown. Four corner brackets connect width and length members together into a frame and four stepdown brackets receive legs of the equipment. Strengthening brackets add to the strength of the stepdown brackets and covers assist in connecting rollers to the corner brackets.

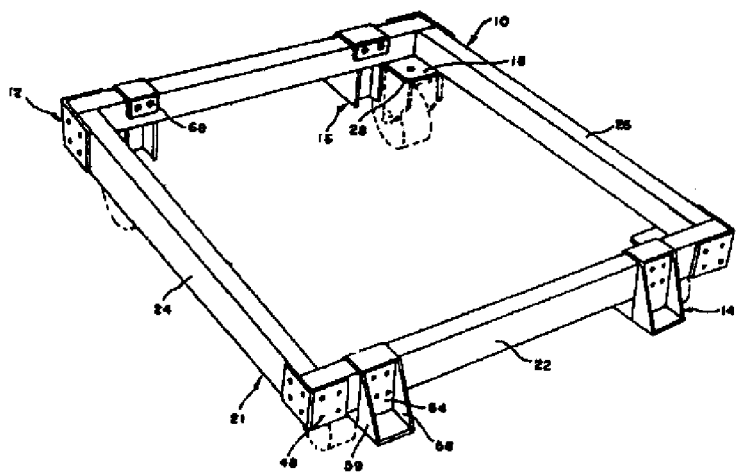

20 Claims, 4 Drawing Sheets